2 Sheets—Sheet 1

J. J. ROBERTS.
Liquid Measure.

No. 210,631. Patented Dec. 10, 1878.

WITNESSES:
E. Bendixen
J. C. Laass

INVENTOR:
James J. Roberts
pr. E. Laass Atty.

2 Sheets—Sheet 2.
J. J. ROBERTS.
Liquid Measure.
No. 210,631. Patented Dec. 10, 1878.
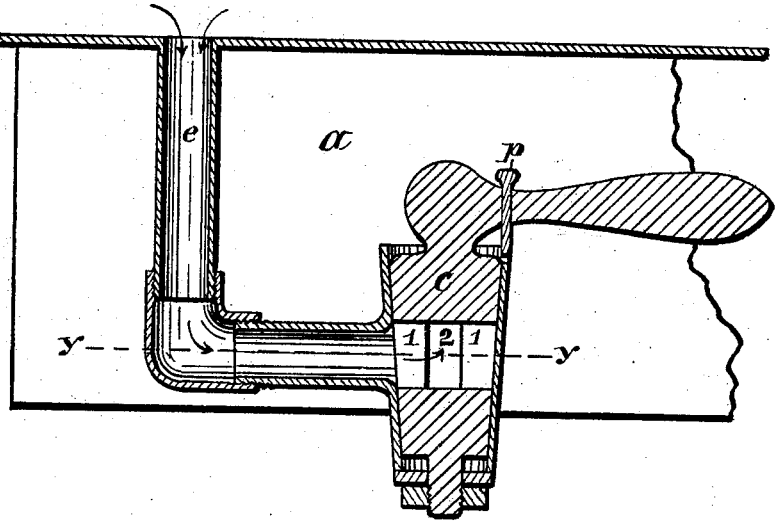
WITNESSES:
E. Bendixen
J. C. Laass
INVENTOR:
Jas. J. Roberts
pr. E. Laass Atty.

UNITED STATES PATENT OFFICE.

JAMES J. ROBERTS, OF GEDDES, NEW YORK, ASSIGNOR TO FRANK J. PLUMB, OF SAME PLACE.

IMPROVEMENT IN LIQUID-MEASURES.

Specification forming part of Letters Patent No. 210,631, dated December 10, 1878; application filed May 31, 1878.

*To all whom it may concern:*

Be it known that I, JAMES J. ROBERTS, of the town of Geddes, in the county of Onondaga and State of New York, have invented new and useful Improvements in Measuring-Tanks, of which the following, taken in connection with the accompanying drawing, is a full, clear, and exact description.

This invention relates to improvements in that class of tanks which have the measures attached under the bottom.

The object of this invention is to provide that class of tanks with cheaper, simpler, more durable, and at the same time convenient means for filling the measures attached under the tank and drawing the liquid therefrom, and which shall also be capable of drawing the liquid when desired direct from the tank without passing through the measure.

The invention consists in the combination, with a tank having the measure attached under the bottom, of a two-way cock having the discharge-passage transversely through the plug, and the inlet from the tank to the measure formed by a lateral orifice intersecting the said passage on one side, and connected with the tank and measure by corresponding branches or shanks on the side of the plug-seat, and provided with a removable pin in the handle for limiting the rotation of the plug, or allowing the same to be turned to form a passage for liquid from the tank to the exit, and also allowing of grinding the plug in its seat, all constructed and combined to operate substantially in the manner hereinafter described.

The invention will be fully understood by referring to the accompanying drawings, wherein—

Figure 1:
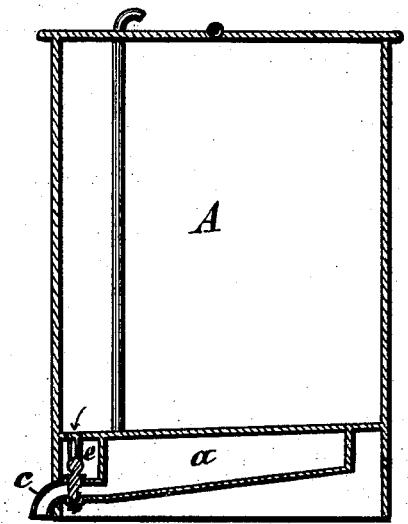
Figure 2:
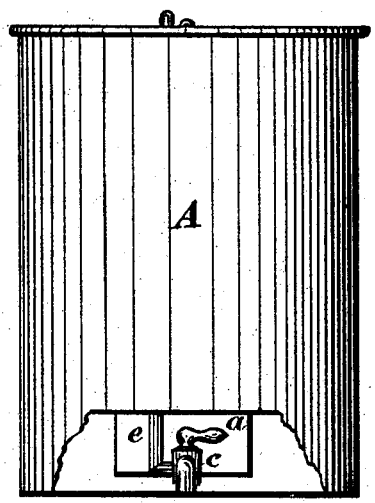

Figure 1 is a vertical section, and Fig. 2 a front view, of my improved measuring-tank, with a portion of the shell removed to show the position of the measure, and the application of the two-way cock for filling and emptying same. Fig. 3 is an enlarged horizontal section of the three-way cock and its connections on line $y\ y$ in Fig. 4; and Fig. 4, an enlarged vertical section of same on line $x\ x$ in Fig. 3.

Similar letters of reference indicate corresponding parts.

A is the tank. $a$ the measure, attached under the bottom of the tank. C is a two-way cock, having one of its ways or shanks connected with the measure, and the other way connected with the tank by a pipe, $e$, or other suitable means, and its plug or spigot of the ordinary form, having the discharge-passage 1 transversely through same, and the branch passage 2 intersecting it on one side, so that by turning it in its seat to close the discharge or delivery the communication between the tank and the measure is opened to allow the liquid to flow into and fill the measure; and vice versa, by turning it to open the discharge of the cock, the inlet from the tank to the measure is closed, thus dispensing with the use of extra valves heretofore employed at the inlet of the measure, and avoiding the danger of neglecting to close the valve before drawing the liquid, and yet keeping the measure constantly filled and ready for drawing the liquid therefrom.

I am aware that cocks having the liquid-passage longitudinally through the plug and the inlet above the outlet have been used in connection with measuring-tanks; but since such construction necessitates elongation of the plug, and is more complicated and expensive, and does not afford other advantages hereinafter mentioned, it does not accomplish the object sought in my invention, and I, therefore, do not claim it.

$p$ is a removable pin inserted vertically through the handle of the cock directly over the top edge of the plug-seat, and, by contact with shoulders on the latter, serves as a gage for limiting the rotation of the plug and bringing the passages respectively in coincidence with the branches of the cock. Whenever it is desired to draw the liquid direct from the tank, as may be the case when the quantity required exceeds the capacity of the measure, or when the tank is to be rapidly emptied, then in either case the pin $p$ is removed to allow the plug to be turned in the direction indicated by an arrow in Fig. 3 of the drawings, until the discharge-passage is brought in coincidence with the branch connected with the tank and the lateral passage opposite the exit of the cock, thus forming a direct discharge from the tank.

The removal of the pin $p$ also allows of grinding the plug in its seat, which heretofore has generally been done by an extra plug.

Having thus described my invention, what I claim is—

The combination, with a tank having the measure attached under the bottom, of the two-way cock $c$, having the discharge-passage 1 transversely through the plug, and the lateral branch passage 2, intersecting the same, and provided with the removable pin $p$, all constructed and combined substantially in the manner described and shown, for the purpose set forth.

In testimony whereof I have signed my name and affixed my seal in the presence of two attesting witness at Syracuse, in the county of Onondaga and State of New York, this 26th day of April, 1876.

JAMES J. ROBERTS. [L. S.]

Witnesses:
 E. BENDIXEN,
 J. C. LAASS.